US012660808B2

(12) United States Patent
Fleming et al.

(10) Patent No.: US 12,660,808 B2
(45) Date of Patent: Jun. 23, 2026

(54) RODENT TRAPPING APPARATUS

(71) Applicant: e-Thrive LLC, Los Gatos, CA (US)

(72) Inventors: Ian Yuta Oki Fleming, Los Gatos, CA (US); Jay N. Rogers, Los Gatos, CA (US)

(73) Assignee: e-Thrive LLC, Los Gatos, CA (US)

( * ) Notice: Subject to any disclaimer, the term of this patent is extended or adjusted under 35 U.S.C. 154(b) by 0 days.

(21) Appl. No.: 18/436,964

(22) Filed: Feb. 8, 2024

(65) Prior Publication Data

US 2025/0255292 A1 Aug. 14, 2025

(51) Int. Cl.
*A01M 23/04* (2006.01)
*A01M 23/06* (2006.01)

(52) U.S. Cl.
CPC ............ *A01M 23/06* (2013.01); *A01M 23/04* (2013.01)

(58) Field of Classification Search
CPC ...... A01M 23/04; A01M 23/06; A01M 23/02; A01M 23/08; A01M 23/14; A01M 23/16; A01M 23/18
USPC .............................. 43/69–72, 74, 64, 60, 61
See application file for complete search history.

(56) References Cited

U.S. PATENT DOCUMENTS

| | | | | | |
|---|---|---|---|---|---|
| 53,164 | A | * | 3/1866 | Melone | A01M 23/04 43/69 |
| 124,838 | A | * | 3/1872 | Lyman | A01M 23/04 43/69 |
| 224,910 | A | * | 2/1880 | Hollem | A01M 23/04 43/69 |
| 271,952 | A | * | 2/1883 | Turley | A01M 23/04 43/69 |
| 290,580 | A | * | 12/1883 | Harwell | A01M 23/04 43/69 |

(Continued)

FOREIGN PATENT DOCUMENTS

| | | | | |
|---|---|---|---|---|
| CH | | 257321 A | * | 10/1948 |
| CN | | 112314583 A | | 2/2021 |

(Continued)

OTHER PUBLICATIONS

Translation of DE 870778C (Year: 1953).*

(Continued)

*Primary Examiner* — Darren W Ark
(74) *Attorney, Agent, or Firm* — AHMANN KLOKE LLP

(57) ABSTRACT

Embodiments of the present invention disclose a rodent trapping apparatus. The rodent trapping apparatus includes a lid including a top surface, wherein the lid comprises a longitudinal slot having two opposing longitudinal edges. Further, the rodent trapping apparatus includes two side-walls provided on the top surface, with one sidewall along each longitudinal edge of the longitudinal slot. The rodent trapping apparatus further includes a transverse connecting member connecting the two sidewalls thereby forming a tunnel over the longitudinal slot, a proximal end of the tunnel being located at the edge of the lid. The rodent trapping apparatus further includes a bait compartment located at a distal end of the tunnel. The rodent trapping apparatus includes a swivel platform located within the longitudinal slot. The swivel platform is configured to swivel about a pivot axis, the pivot axis being located between the distal end and the proximal end of the tunnel.

27 Claims, 13 Drawing Sheets

(56) References Cited

U.S. PATENT DOCUMENTS

| | | | | |
|---|---|---|---|---|
| 947,250 | A * | 1/1910 | Marchand | A01M 21/00 43/70 |
| 1,204,472 | A * | 11/1916 | Mills | A01M 21/00 43/70 |
| 1,258,960 | A * | 3/1918 | Swain | A01M 23/04 43/69 |
| 1,272,974 | A * | 7/1918 | Lycan | A01M 23/04 43/69 |
| 1,335,882 | A * | 4/1920 | Drag | A01M 23/18 43/69 |
| 1,353,882 | A * | 9/1920 | Wojcik | A01M 23/00 43/69 |
| 1,366,989 | A * | 2/1921 | Wigington | A01M 23/18 43/69 |
| 1,402,197 | A * | 1/1922 | James | A01M 23/18 43/69 |
| 1,418,864 | A * | 6/1922 | Cain | A01M 23/18 43/74 |
| 1,466,178 | A * | 8/1923 | Lange | A01M 23/06 43/69 |
| 1,501,378 | A * | 7/1924 | Talisman | A01M 23/14 43/69 |
| 1,743,614 | A * | 1/1930 | Morrison | A01M 23/00 43/69 |
| 2,163,577 | A * | 6/1939 | Allen | A01M 23/02 43/70 |
| 2,210,174 | A * | 8/1940 | Moore | A01M 23/04 43/67 |
| 2,374,691 | A * | 5/1945 | Middleton | A01M 23/06 43/69 |
| 2,437,248 | A * | 3/1948 | Fleig | A01M 23/08 43/69 |
| 2,490,540 | A * | 12/1949 | Price | A01M 23/16 43/69 |
| 2,564,134 | A * | 8/1951 | Streed | A01M 23/04 43/70 |
| 2,565,142 | A * | 8/1951 | Mattingly | A01M 1/103 43/131 |
| 2,611,990 | A * | 9/1952 | Lundquist | A01M 23/06 43/70 |
| 2,733,541 | A | 2/1956 | McKim | |
| 2,741,866 | A * | 4/1956 | Shirley | A01M 23/04 43/69 |
| 2,763,092 | A * | 9/1956 | Sheridan | A01M 23/18 43/99 |
| 2,766,550 | A * | 10/1956 | Johnson | A01M 23/18 43/69 |
| 2,780,024 | A * | 2/1957 | Mckim | A01M 23/18 43/70 |
| 2,813,370 | A * | 11/1957 | Guzik | A01M 23/00 43/70 |
| 2,825,995 | A * | 3/1958 | Snider | A01M 23/06 43/69 |
| 2,850,835 | A * | 9/1958 | Scheidegger | A01M 23/14 43/70 |
| 3,778,923 | A * | 12/1973 | Cuoco | A01M 23/04 43/69 |
| 3,936,972 | A * | 2/1976 | Meyers | A01M 23/04 43/69 |
| 4,154,016 | A * | 5/1979 | Reyes | A01M 23/04 43/69 |
| 4,241,531 | A * | 12/1980 | Nelson | A01M 23/04 43/69 |
| 4,748,766 | A * | 6/1988 | Stimac | A01M 23/04 43/69 |
| 4,829,704 | A * | 5/1989 | Richardson | A01M 23/08 43/66 |
| 4,876,821 | A * | 10/1989 | Benzie | A01M 23/04 43/69 |
| 5,305,545 | A * | 4/1994 | Cerullo | A01M 23/06 43/72 |
| 5,471,781 | A * | 12/1995 | Vine | A01M 23/04 43/69 |
| 5,611,171 | A * | 3/1997 | Hershey | A01M 23/02 43/64 |
| 5,720,125 | A * | 2/1998 | Oviatt | A01M 23/20 43/61 |
| 6,088,948 | A * | 7/2000 | Rønnau | A01M 23/12 43/72 |
| 6,557,295 | B1 * | 5/2003 | Alonso | A01M 23/04 43/69 |
| 8,205,377 | B1 * | 6/2012 | Wilson | A01M 23/04 43/69 |
| 8,438,777 | B2 * | 5/2013 | Uhlik | A01M 23/12 43/72 |
| 9,801,367 | B2 * | 10/2017 | Ferrante | A01M 23/14 |
| 10,945,425 | B2 * | 3/2021 | Matzen | A01M 23/04 |
| 11,116,201 | B1 * | 9/2021 | Melville, Jr. | A01M 23/10 |
| 11,166,448 | B2 * | 11/2021 | Matzen | A01M 23/04 |
| D982,705 | S * | 4/2023 | Zhang | D22/119 |
| 11,678,654 | B1 * | 6/2023 | Suteerawanit | A01M 23/12 43/69 |
| 11,758,898 | B1 * | 9/2023 | Shoemaker, Jr. | A01M 23/04 43/69 |
| 12,167,727 | B1 * | 12/2024 | Bradwell | A01M 23/24 |
| 2003/0084603 | A1 * | 5/2003 | Lafforthun | A01M 23/18 43/61 |
| 2005/0081425 | A1 * | 4/2005 | Guidry | A01M 23/04 43/69 |
| 2006/0026893 | A1 * | 2/2006 | Sears | A01M 23/04 43/69 |
| 2008/0120895 | A1 * | 5/2008 | Schwartz | A01M 31/002 43/99 |
| 2009/0205245 | A1 * | 8/2009 | Orchard | A01M 31/002 43/65 |
| 2010/0257772 | A1 * | 10/2010 | Uhlik | A01M 23/12 43/61 |
| 2011/0047858 | A1 * | 3/2011 | Wu | A01M 23/04 43/69 |
| 2012/0174469 | A1 * | 7/2012 | Gardner | A01M 23/08 43/60 |
| 2014/0352199 | A1 * | 12/2014 | Matney | A01M 23/04 43/61 |
| 2015/0128480 | A1 * | 5/2015 | Pinder | A01M 23/14 43/69 |
| 2015/0335005 | A1 * | 11/2015 | Ferrante | A01M 23/20 43/61 |
| 2016/0143262 | A1 * | 5/2016 | Pecoraro | A01M 23/04 43/62 |
| 2017/0231214 | A1 * | 8/2017 | Vaisblat | A01M 31/002 43/60 |
| 2017/0265451 | A1 | 9/2017 | Pinder | |
| 2018/0325093 | A1 | 11/2018 | Vickery | |
| 2021/0368774 | A1 * | 12/2021 | Jordan | A01M 31/002 |
| 2022/0132832 | A1 * | 5/2022 | Neph | A01M 23/08 43/58 |

FOREIGN PATENT DOCUMENTS

| | | | | |
|---|---|---|---|---|
| DE | 351978 | C * | 4/1922 | |
| DE | 421450 | C * | 11/1925 | |
| DE | 598516 | C * | 6/1934 | |
| DE | 870778 | C * | 3/1953 | |
| DE | 1607363 | A1 * | 10/1970 | |
| DE | 29500526 | U1 * | 3/1996 | |
| DE | 29709597 | U1 * | 8/1997 | A01M 23/04 |
| EP | 0250949 | A2 * | 1/1988 | |
| FR | 2753880 | A1 * | 4/1998 | A01M 23/04 |
| GB | 2410667 | A * | 8/2005 | A01M 23/04 |
| GB | 2575677 | A * | 1/2020 | A01M 23/04 |
| GB | 2617262 | A * | 10/2023 | A01M 23/04 |
| JP | 3160975 | U * | 7/2010 | |
| KR | 20110000959 | U * | 1/2011 | |
| SU | 112663 | A1 * | 11/1957 | |
| SU | 1761077 | A1 * | 9/1992 | |
| WO | WO-0211535 | A1 * | 2/2002 | A01M 23/04 |
| WO | WO-2013173866 | A1 * | 11/2013 | A01M 19/00 |
| WO | WO-2014111857 | A1 * | 7/2014 | A01M 23/04 |

(56)        References Cited

FOREIGN PATENT DOCUMENTS

| WO | WO-2014203166 A1 * | 12/2014 | ........... | A01M 23/04 |
| WO | WO-2016026410 A1 * | 2/2016 | ........... | A01M 23/18 |
| WO | WO-2020118382 A1 * | 6/2020 | | |
| WO | WO-2024030262 A1 * | 2/2024 | ........... | A01M 23/04 |

OTHER PUBLICATIONS

Gilber Proilx, Mammal Trapping, Marcel Dekker, Inc.,2007,p. 1-3,Canada.
International Application No. PCT/US2025/014460, Search Report and Written Opinion dated May 5, 2025.

* cited by examiner

RODENT TRAPPING APPARATUS

TECHNICAL FIELD

The present invention generally relates to animal traps and, more particularly, the present invention relates to traps for catching rodents that are comparatively larger in size, such as full-grown rats.

BACKGROUND ART

In general, bucket lid traps function by placing bait at an end of a tunnel. A mouse walks up the ladder and moves toward the bait. The weight of the mouse triggers a swivel platform to fall forward. As the swivel platform rotates, the mouse has nothing to support or hold onto, because it is inside the tunnel. As the swivel platform moves from being horizontal to angled downwards, the mouse slides down the platform. The further it slides in the horizontal direction, the further the weight of the mouse is from the pivot, resulting in an increasing moment on the falling side, and accelerated fall. The mouse falls into the bucket. The platform resets itself.

U.S. Pat. No. 11,166,448B2 issued to RICKEY MOUSE COMPANY LLC discloses an animal trap apparatus having a collection of individual components mounted onto a rim of a bucket and including a plank having a bait receiving end and a mounting end, with a fulcrum feature therebetween. In use, the plank is configured to pivot about the fulcrum feature in a forward direction when an animal approaches the bait receiving end thereby placing the animal trap apparatus in a tripped condition whereby the bait receiving extends downwardly toward the closed bottom of the bucket and the animal falls into the cavity.

Such traps work very well for mice. However, when it comes to rats or larger rodents, the rats or larger rodents can hold on to the edge of the entrance of the tunnel, reach for the bait in the tunnel, and acquire the bait without falling into the bucket. This is because rats are larger than mice, and tend to be more agile and skittish or cautious in nature.

Therefore, there exists a technological need for an apparatus that overcomes the disadvantages and limitations associated with the prior art and provides a more satisfactory solution.

SUMMARY OF THE INVENTION

According to an aspect of the present invention, there is provided a rodent trapping apparatus for trapping rodents. The rodent trapping apparatus includes a lid configured to be disposed on a bucket, the lid including a top surface, wherein the lid comprises a longitudinal slot having two opposing longitudinal edges. Further, the rodent trapping apparatus includes two sidewalls provided on the top surface, with one sidewall along each longitudinal edge of the longitudinal slot, wherein the two sidewalls extend up to an edge of the lid. The rodent trapping apparatus further includes a transverse connecting member connecting the two sidewalls thereby forming a tunnel over the longitudinal slot, a proximal end of the tunnel being located at the edge of the lid due to the two sidewalls extending up to the edge of the lid. The rodent trapping apparatus further includes a bait compartment located at a distal end of the tunnel, the distal end of the tunnel being formed by a distal connecting portion of the transverse connecting member and two distal segments of the two sidewalls. The rodent trapping apparatus also includes a swivel platform located within and along the longitudinal slot, wherein the swivel platform is configured to swivel about a pivot axis, wherein the pivot axis is located between the distal end and the proximal end of the tunnel.

In one embodiment of the invention, the bait compartment is disposed at a distance from the pivot axis, wherein the distance between the bait compartment and the pivot axis lies in the range of 3 to 12 inches.

In one embodiment of the invention, the swivel platform is inclined at an angle with respect to the horizontal, the angle of incline of the swivel platform, with respect to the horizontal lies in the range of 0 to 45 degrees.

In one embodiment of the invention, the proximal end of the tunnel is disposed at a distance from the pivot axis lies in the range of 3 to 10 inches.

In one embodiment of the invention, the bait compartment includes a cover and a material of the cover is stainless steel.

In one embodiment of the invention, the rodent trapping apparatus includes at least one first securing member and at least one second securing member. The first securing member is mounted to the lid and adapted to disable movement of the swivel platform during a disabled state of the rodent trapping apparatus. The second securing member mounted to the cover and the bucket and adapted to lock the cover with the bucket, during an enabled state of the rodent trapping apparatus.

In one embodiment of the invention, the rodent trapping apparatus further includes a ramp configured to be provided between the ground and the top surface of the lid, wherein the ramp connects the ground level with the top surface of the lid at the proximal end of the tunnel.

In one embodiment of the invention, the transverse connecting member further includes an inclined connecting portion connecting the two sidewalls and providing an inclined section to the tunnel.

In one embodiment of the invention, the bucket is a five-gallon bucket and the lid includes an overhang portion that extends beyond the edge of the bucket.

In one embodiment of the invention, the lid comprises a portion extending downwards to a predetermined depth to create a rim structure, wherein in use, the rim structure is adapted to run along an inner surface of a peripheral wall of the bucket, while maintaining a minimum predetermined distance from the inner surface.

In one embodiment of the invention, the lid, the two sidewalls, the transverse connecting member, the bait compartment, and the swivel platform are modular units and are connected to form the rodent trapping apparatus using one or more securing members.

In one embodiment of the invention, the swivel platform includes a first portion positioned below the distal end of the tunnel. The first portion includes the one or more securing members. The one or more securing members have one or more magnets of varying magnetic strength, adapted to increase a distance between the pivot axis and center of gravity of the rodent.

In one embodiment of the invention, the swivel platform includes a second portion positioned below the distal end of the tunnel. The second portion includes a loading element configured to reset the swivel platform after the rodent is trapped inside the bucket.

According to another aspect of the invention, there is provided a rodent trapping apparatus for trapping rodents. The rodent trapping apparatus includes a lid configured to be disposed on a bucket, the lid including a top surface, wherein the lid comprises a longitudinal slot having two opposing longitudinal edges. Further, the rodent trapping apparatus includes two sidewalls provided on the top surface, with one sidewall along each longitudinal edge of the longitudinal slot, wherein the two sidewalls extend up to an edge of the lid. The rodent trapping apparatus further includes a transverse connecting member connecting the two sidewalls thereby forming a tunnel over the longitudinal slot, a proximal end of the tunnel being located at the edge of the lid due to the two sidewalls extending up to the edge of the lid. The rodent trapping apparatus further includes a bait compartment located at a distal end of the tunnel, the distal end of the tunnel being formed by a distal connecting portion of the transverse connecting member and two distal segments of the two sidewalls. The rodent trapping apparatus also includes a swivel platform located within and along the longitudinal slot, wherein the swivel platform is configured to swivel about a pivot axis, wherein the pivot axis is located between the distal end and the proximal end of the tunnel. The proximal end of the tunnel comprises one or more securing members for connecting the swivel platform with the lid, the one or more securing members are one or more magnets of varying magnetic strength adapted to increase a distance between the pivot axis and center of gravity of the rodent.

According to another aspect of the present invention, there is provided a rodent trapping apparatus for trapping rodents. The rodent trapping apparatus includes a lid configured to be disposed on a bucket, the lid including a top surface, wherein the lid comprises a longitudinal slot having two opposing longitudinal edges. Further, the rodent trapping apparatus includes two sidewalls provided on the top surface, with one sidewall along each longitudinal edge of the longitudinal slot, wherein the two sidewalls extend up to an edge of the lid. The rodent trapping apparatus further includes a transverse connecting member connecting the two sidewalls thereby forming a tunnel over the longitudinal slot, a proximal end of the tunnel being located at the edge of the lid due to the two sidewalls extending up to the edge of the lid. The rodent trapping apparatus further includes a bait compartment located at a distal end of the tunnel, the distal end of the tunnel being formed by a distal connecting portion of the transverse connecting member and two distal segments of the two sidewalls. The rodent trapping apparatus also includes a swivel platform located within and along the longitudinal slot, wherein the swivel platform is configured to swivel about a pivot axis, wherein the pivot axis is located between the distal end and the proximal end of the tunnel. The lid, the two sidewalls, the transverse connecting member, the bait compartment, and the swivel platform are modular units and are connected to form the rodent trapping apparatus using one or more securing members.

BRIEF DESCRIPTION OF THE ACCOMPANYING DRAWINGS

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 9:
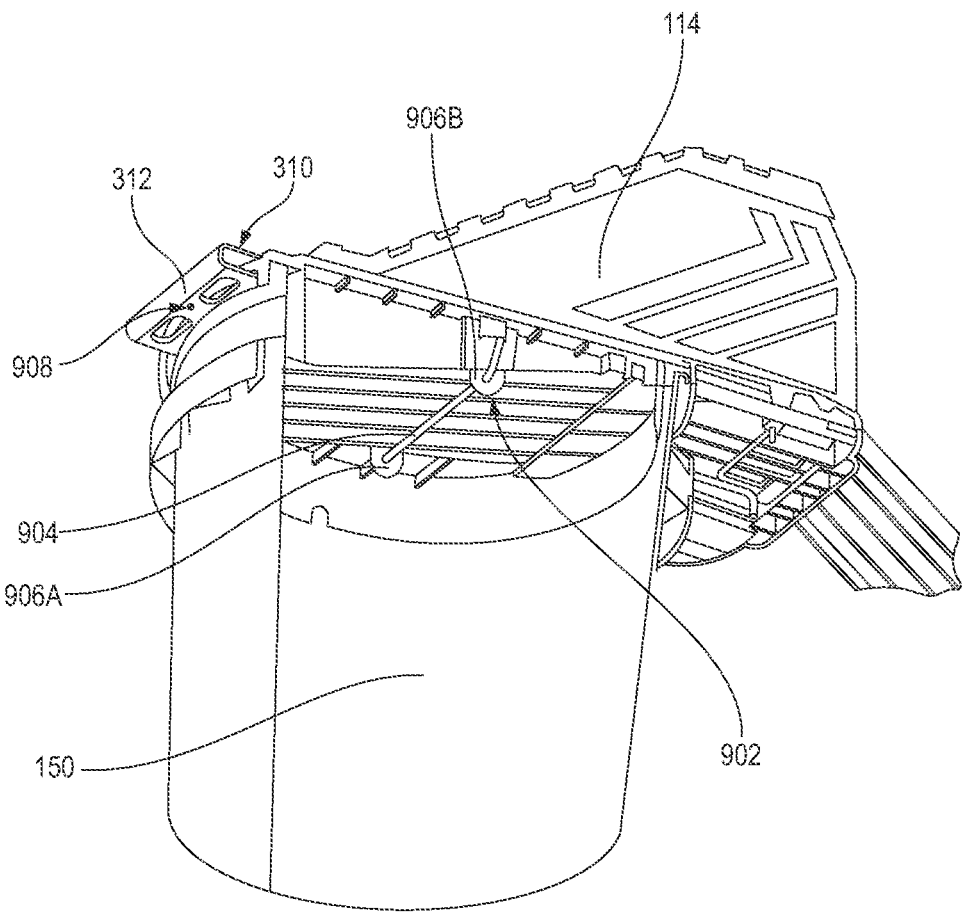
FIG. 9 illustrates a left sectional view of the rodent trapping apparatus of FIG. 7 with at least one first securing member and at least one second securing member, for enabling and disabling the rodent trapping apparatus, in accordance with an embodiment of the present invention.
Figure 10A:
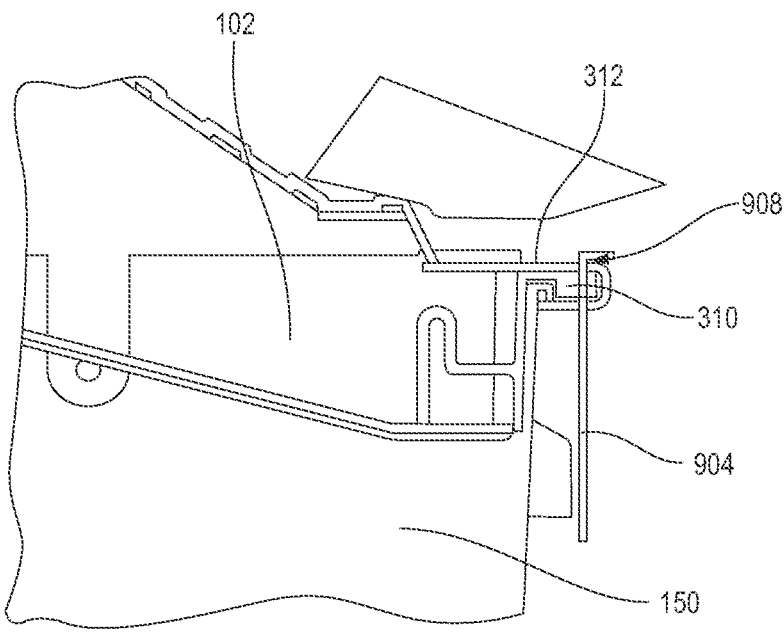
Figure 10B:
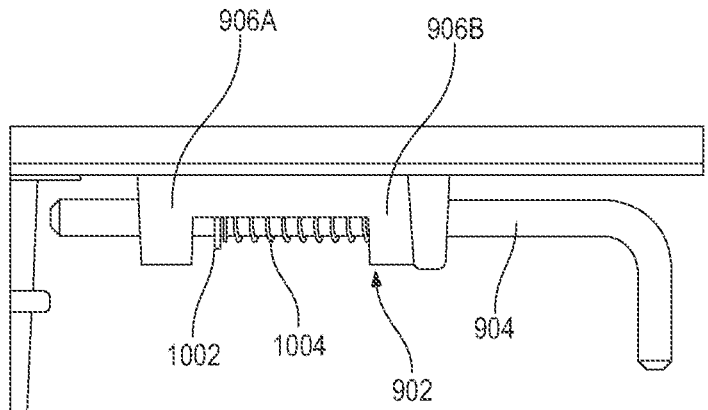

FIG. 10A illustrates a left sectional view of the second securing structure for locking a cover of the bait compartment of the rodent trapping apparatus of FIG. 9, in accordance with an embodiment of the present invention; and FIG. 10B illustrates a left sectional view of the first securing structure, for enabling and disabling the rodent trapping apparatus of FIG. 9, in accordance with an embodiment of the present invention.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments of the present invention provide a rodent trapping apparatus for trapping rodents that is suitable for catching large rodents. In that regard, a lid configured to be disposed on a bucket is provided. A longitudinal slot has been provided in the lid and a swivel platform has been disposed within and along the longitudinal slot. The swivel platform is configured to swivel about a pivot axis. Further, a tunnel has been provided over the longitudinal slot in a manner that a distal end of the tunnel includes a bait compartment for receiving bait for the rodents. Moreover, the tunnel has been so designed that the pivot axis lies between the distal end and a proximal end of the tunnel. To further make the design of the rodent trapping apparatus more effective, the swivel platform has been made inclined with respect to the horizontal. The lengths of the tunnel and the swivel platform have been selected so that the distance between the bait compartment and the pivot axis is greater than the distance between the nose and center of gravity of the rodent, and the distance between the pivot axis and the proximal end of the tunnel is greater than the distance between hind legs stretched out and the center of gravity of the rodent.

Various example embodiments of the present invention are described hereinafter with reference to FIG. 1A-1B to FIG. 5.

Figure 1A:
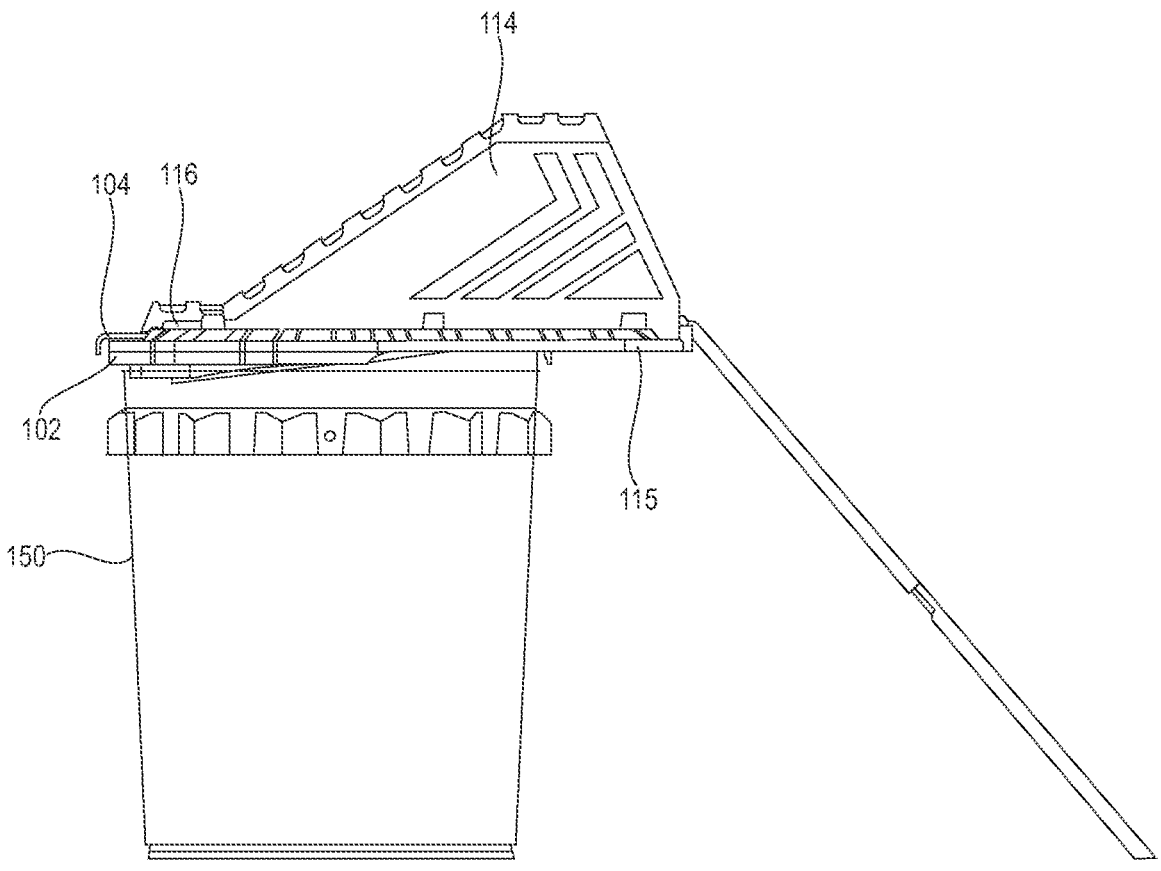
FIG. 1A illustrates a side view of a rodent trapping apparatus installed with a bucket, for trapping rodents, in accordance with an embodiment of the present invention.
Figure 1B:
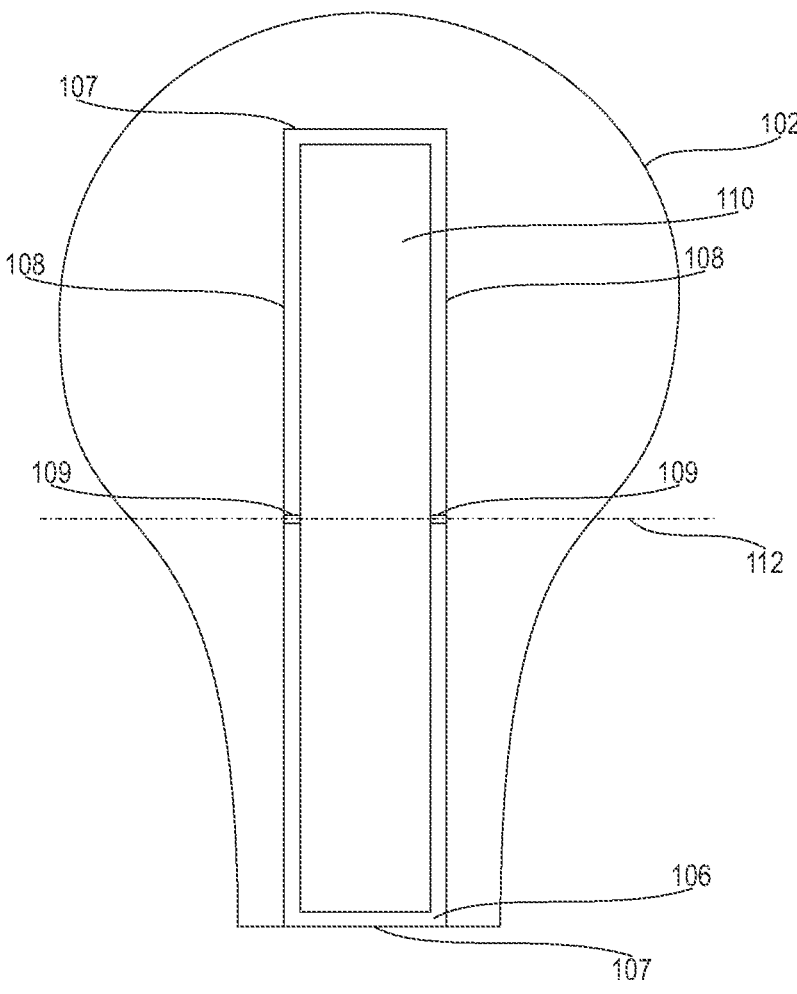
FIG. 1B illustrates a bottom view of the rodent trapping apparatus of FIG. 1A.

FIG. 1A illustrates a side view of a rodent trapping apparatus 100 installed with a bucket 150, for trapping rodents, in accordance with an embodiment of the present invention. FIG. 1B illustrates a bottom view of the rodent trapping apparatus of FIG. 1A. Referring to FIGS. 1A and 1B, a lid 102 is configured to be disposed onto a bucket 150. The lid 102 may be made up of a polymer material such as Polyvinyl Chloride (PVC), High-Density Polyethylene (HDPE), Low-Density Polyethylene (LDPE), Acrylonitrile Butadiene Styrene (ABS) and the like. The lid 102 may be disposed of on top of the bucket 150, along the rim of the bucket 150 using snap-fit fasteners. In several embodiments of the invention, the bucket 150 is a five-gallon bucket. The advantage of using a five-gallon bucket as the bucket 150 is that five-gallon buckets are readily available in the market at low costs through several brands such as, but not limited to, Lowes, Ace Hardware, and Home Depot, etc. In the embodiments, where the bucket 150 is the five-gallon bucket, the lid 102 extends beyond the outer perimeter of the bucket 150 forming an overhang portion 115 that extends beyond the edge of the bucket 150. A five-gallon bucket generally has a diameter in the range of 11.8 to 12 inches. A standard circular lid for the five-gallon bucket would not allow the rodent trapping apparatus 100 to assume relatively larger dimensions required for trapping larger rodents such as large rats. The overhang portion 115 increases the overall size of the lid and allows several components, such as a swivel platform and a tunnel (See FIG. 2), of the rodent trapping apparatus 100 to assume larger dimensions that would allow the trapping of relatively larger rodents. The overhang portion 115 allows several components of the rodent trapping apparatus 100 to assume larger dimensions that would allow the trapping of relatively larger rodents. In several alternate embodiments of the invention, the size of the bucket 150 may be selected from a group of sizes consisting of twenty gallons, thirty-two gallons, and forty-four gallons. In the alternative embodiments, where the bucket 150 assumes relatively larger sizes, the lid 102 may not extend beyond the edge of the bucket 150, since the larger sizes of the bucket 150 would be adequate to incorporate the larger dimensions of the rodent trapping apparatus 100 that may be required to trap relatively larger rodents. The lid 102 includes a top surface 104. The lid 102 also includes a longitudinal slot 106. In several embodiments, the longitudinal slot 106 may be provided along the diameter of the lid 102. In several alternate embodiments, the longitudinal slot 106 may be provided parallel to the diameter of the lid 102 and may be shorter in length compared to the diameter of the lid 102.

The longitudinal slot 106 has two opposing longitudinal edges 108 and two transverse edges 107. In several embodiments, the longitudinal slot 106 may be rectangular in shape. In that regard, the two opposing longitudinal edges 108 may be parallel to each other. In several alternate embodiments, the longitudinal slot 106 may not be rectangular and the two opposing longitudinal edges 108 may be convergent or divergent in nature. In several embodiments of the invention, the two opposing longitudinal edges 108 and thus the longitudinal slot 106 may be inclined with respect to the horizontal. Two sidewalls 114 have been provided on the top surface 104. One sidewall 114 has been provided along each one of the two opposing longitudinal edges 108. Each one of the two sidewalls 114 includes a distal segment 116. A swivel platform 110 has been disposed of within and along the longitudinal slot 106. The swivel platform 110 has been balanced on two pivot points 109 provided on the two opposing longitudinal edges 108. Each longitudinal edge 108 has one pivot point 109. A pivot axis 112 connects the two pivot points 109. The swivel platform 110 is configured to swivel about the pivot axis 112.

Figure 2A:
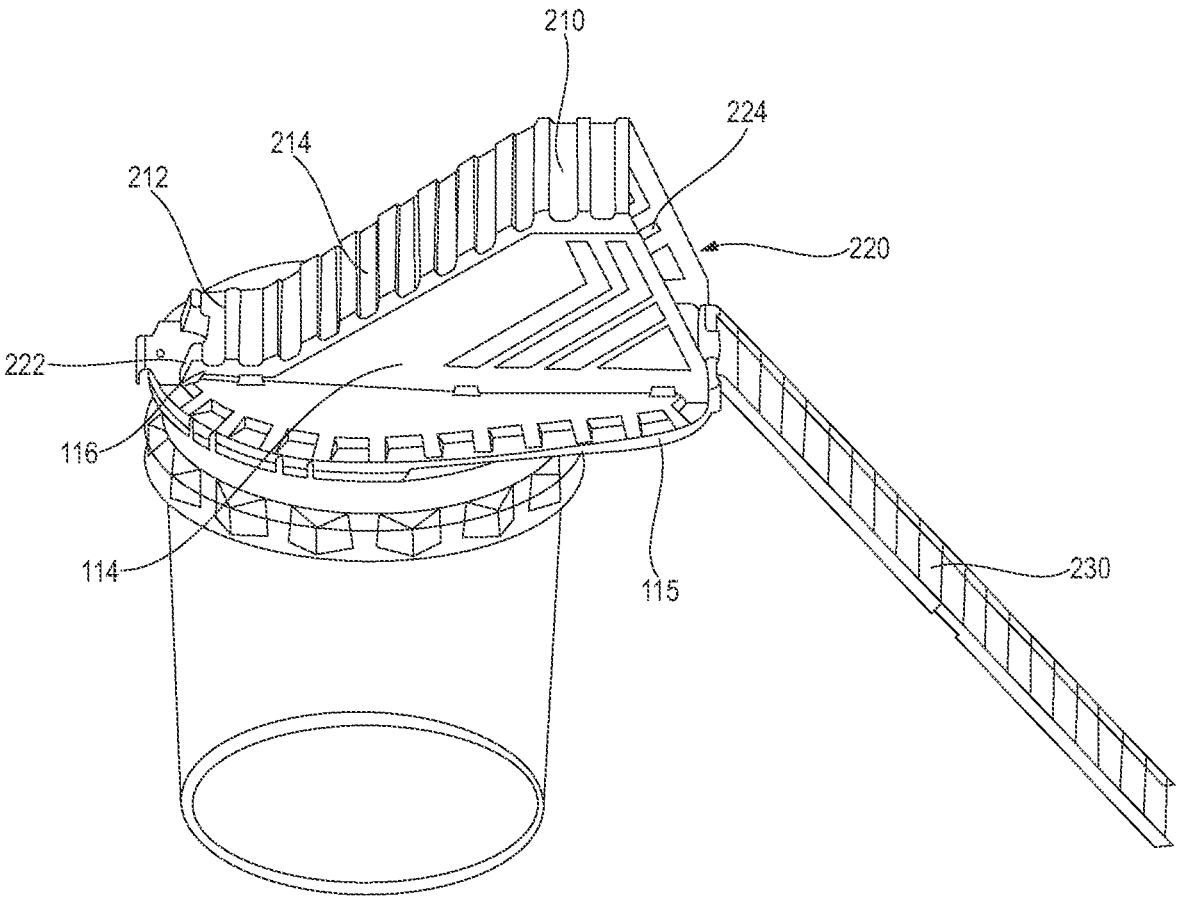
FIG. 2A illustrates a side perspective view of the rodent trapping apparatus for trapping rodents, in accordance with an embodiment of the present invention.
Figure 2B:
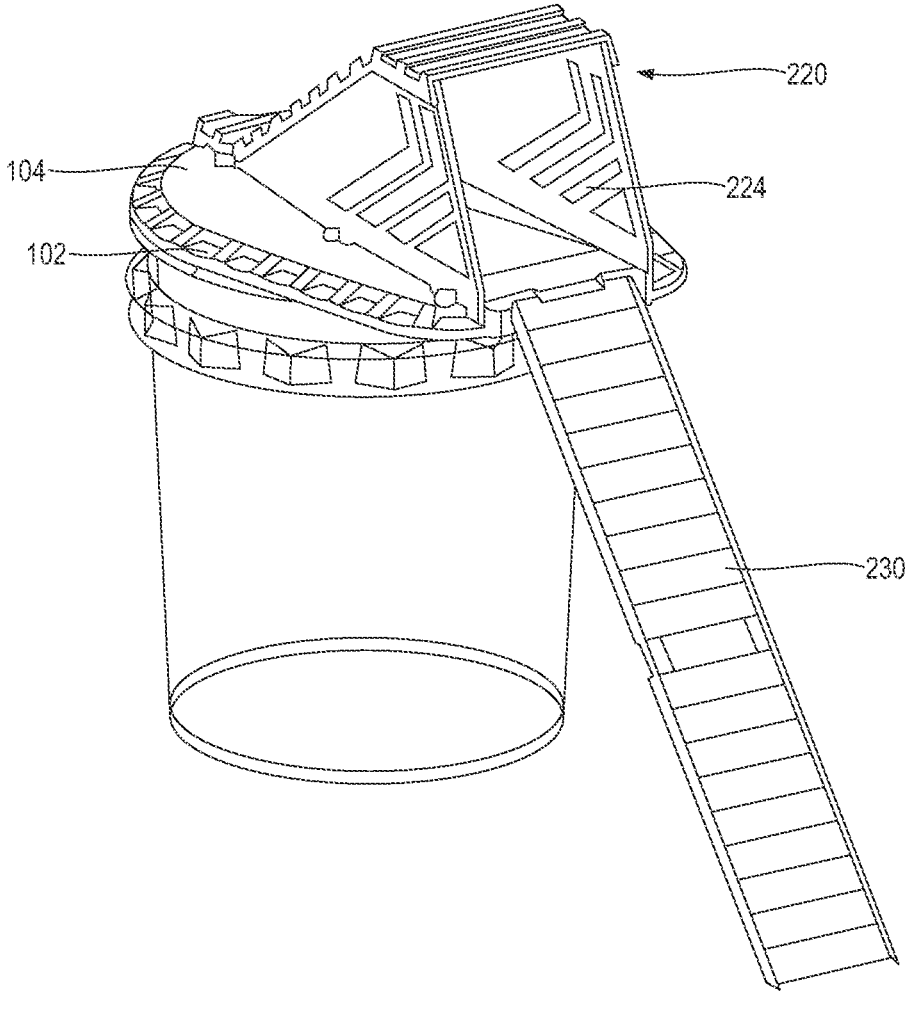
FIG. 2B illustrates a front perspective view of the rodent trapping apparatus of FIG. 2A.

FIG. 2A illustrates a side perspective view of the rodent trapping apparatus 100 for trapping rodents, in accordance with an embodiment of the present invention. FIG. 2B illustrates a front perspective view of the rodent trapping apparatus of FIG. 2A. In reference to FIGS. 2A and 2B, a transverse connecting member 210 connects the two sidewalls 114. The transverse connecting member 210 and the two sidewalls 114 together form a tunnel 220 over the longitudinal slot 106 and the swivel platform 110. The transverse connecting member 210 has a distal connecting portion 212. The distal connecting portion 212 connects the two distal segments 116 of the two sidewalls 114 at a distal end 222 of the tunnel 220. The tunnel 220 also has a proximal end 224 at the mouth of the tunnel 220. Moreover, the two sidewalls 114 and consequently the tunnel 220 extend up to the edge of the lid 102. In that manner, the proximal end of the tunnel 220 is located at the edge of the lid 102 due to the two sidewalls 114 extending up to the edge of the lid 102.

Extending the tunnel 220 up to the edge of the lid 102 ensures that the rodents are not able to circumvent the tunnel 220 as they climb up to the lid 102 using a ramp 230. It also prevents the rodents from chewing their way through to the bait from other parts of the rodent trapping apparatus 100. The transverse connecting member 210 also has an inclined connecting portion 214. The inclined connecting portion 214 along with the two sidewalls 114 provide the tunnel 220 its characteristic inclined shape. The ramp 230 is configured to be provided between the ground level and the top surface 104 of the lid 102. The ramp 230 connects the ground level with the top surface 104 of the lid 102 at the proximal end 224 of the tunnel 220. The connection of the ramp 230 at the proximal end 224 of the tunnel 220 forces the rodents directly into the tunnel 220, without allowing them to circumvent the tunnel 220 as the rodents climb up the ramp 230. The ramp 230 of the present invention has been made strong and broad enough to support large rodents as they climb from the level ground to the top surface 104 of the lid 102.

Figure 3:
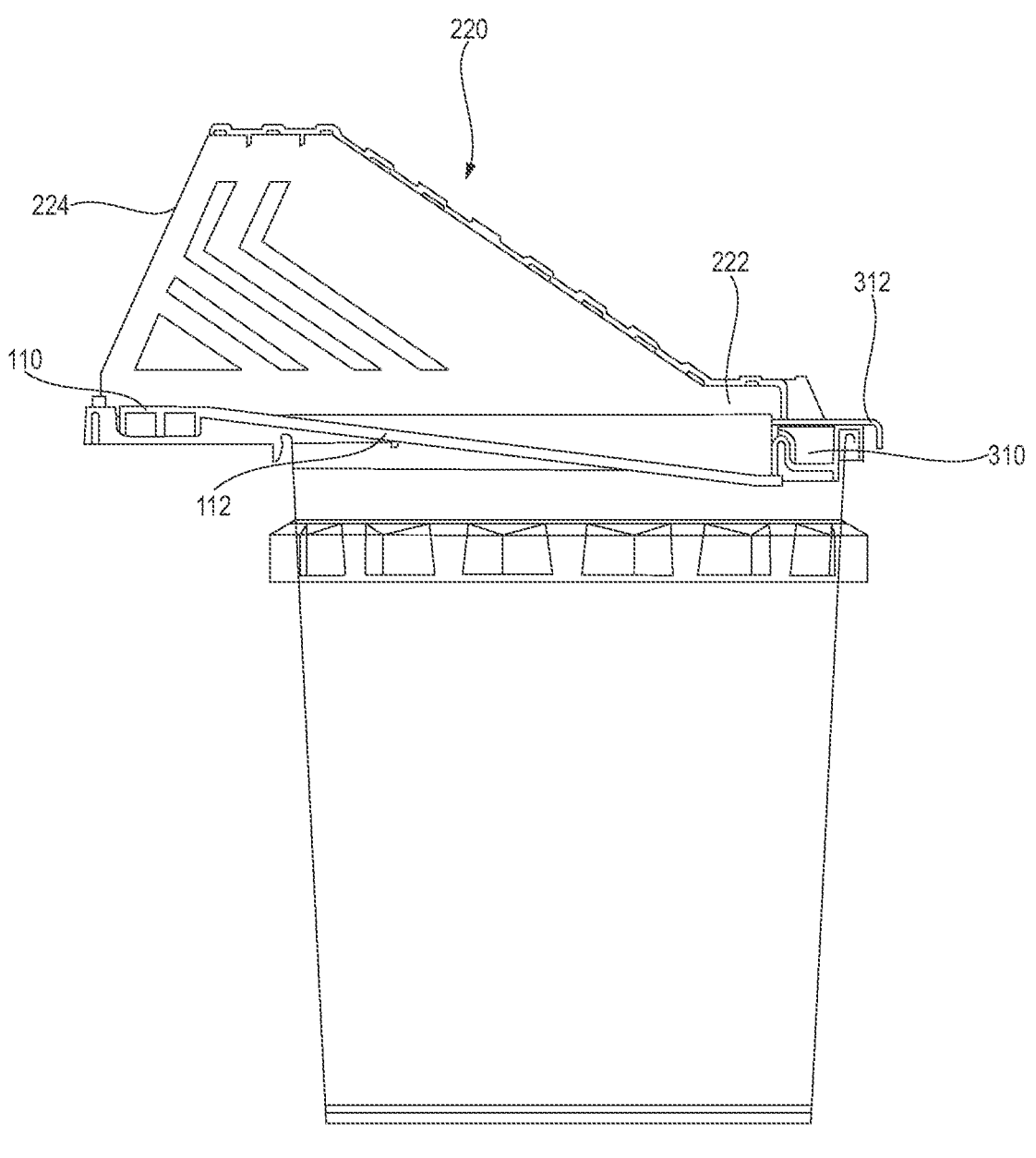
FIG. 3 illustrates a left sectional view of the rodent trapping apparatus, in accordance with an embodiment of the present invention.

FIG. 3 illustrates a left sectional view of the rodent trapping apparatus 100, in accordance with an embodiment of the present invention. A bait compartment 310 is located at the distal end 222 of the tunnel 220. The bait compartment 310 has the function of receiving bait to lure the rodents into the tunnel 220. The bait compartment 310 includes a cover 312 for direct access to the bait compartment 310 without lifting the lid 102 from the bucket 150. The material of the cover 312 of the bait compartment 310 is stainless steel. In several embodiments of the invention, the distal connecting portion 212 of the transverse connecting member 210 and the two distal segments 116 of the two sidewalls 114 are also made from stainless steel. In several alternate embodiments, the entire transverse connecting member 210 is made up of stainless steel. Using stainless steel as a material ensures that the rodents are not able to chew through the polymeric material surrounding the bait compartment 310, since the bait compartment 310 is located at the distal end 222 of the tunnel 220. FIG. 3 also illustrates that the pivot axis 112 of the swivel platform 110 is disposed between the distal end 222 and the proximal end 224 of the tunnel 220. Locating the pivot axis 112 between the distal end 222 and the proximal end 224 ensures that rodents lured into the rodent trapping apparatus 100 are not able to reach backward and hold onto the entrance of the tunnel 220 as the swivel platform 110 swivels or pivots about the pivot axis 112.

Figure 4:
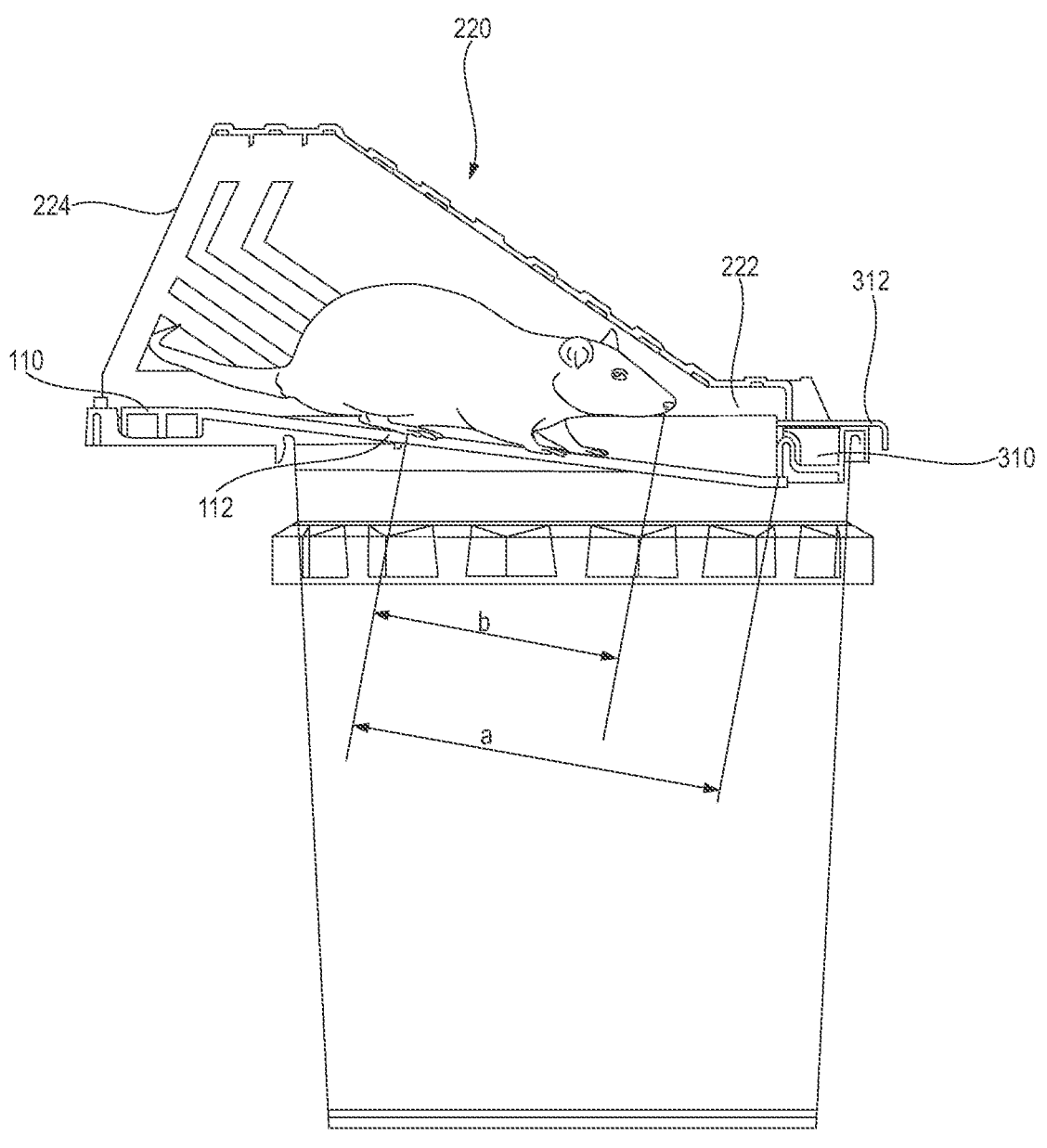
FIG. 4 illustrates a left sectional view of the rodent trapping apparatus with a rodent reaching out to the bait compartment, in accordance with an embodiment of the present invention.

FIG. 4 illustrates a left sectional view of the rodent trapping apparatus 100 with a rodent reaching out to the bait compartment 310, in accordance with an embodiment of the present invention. To ensure that the rodent is not able to balance itself on the swivel platform 110, the distance (a) between the bait compartment 310 and the pivot axis 112 should be greater than the distance (b) between the nose of a target rodent and its center of gravity. An average large rodent measures 10 inches. Assuming that the shape of the tunnel 220 and the location of the bait compartment 310 forces the rodent into crawling thereby shifting the center of gravity closer to the middle portion of the rodent, (a) should be greater than 5 inches. Therefore, in several embodiments of the invention, the distance (a) between the bait compartment 310 and the pivot axis 112 has been designed to be greater than 5 inches, preferably lie in the range of 6-12 inches, and most preferably lie in the range of 7 to 10 inches.

Also, it is to be noted that larger rodents such as rats are very agile and can balance their center of gravity over the pivot axis 112 when the swivel platform 110 is horizontal. Moreover, in some cases, larger rodents can reverse the rotation motion of the swivel platform 110 much more easily, if the swivel platform 110 is horizontally oriented. To ensure that the larger rodents are not able to balance themselves over the pivot axis 112, or reverse the rotation motion of the swivel platform 110, the swivel platform 110 is inclined at an angle with respect to the horizontal, along the longitudinal slot 106. The angle of incline of the swivel platform 110 has been designed to lie in the range of 2.5 to 45 degrees, more preferably lie in the range of 6 to 30 degrees, and most preferably lie in the range of 10 to 20 degrees. In one example embodiment of the invention, the angle of incline of the swivel platform 110 has been designed to be 15.4 degrees. The swivel platform 110 that is inclined ensures that the time between the starting of the rotary motion of the swivel platform 110 and the sliding motion of the rodent is reduced considerably.

The rotary motion of the swivel platform 110 is initiated as the rodent moves towards the bait and tips the balance of the swivel platform 110. As the swivel platform 110 rotates, the frictional force holding the rodent on the swivel platform 110 becomes less than the gravitational force pulling the rodent along the swivel platform 110 thereby initiating the sliding of the rodent. The sliding motion causes a greater moment (force (weight of the rodent)×distance (distance of the rodent from the pivot axis 112 achieved due to sliding of the rodent)) to be exerted about the pivot axis 112 thereby accelerating the rotation of the swivel platform 110. The accelerated rotation further accelerates the sliding which further accelerates the rotation and so on and so forth, and the rodent is trapped inside the bucket 150. Therefore, the chances of the rodent getting trapped are increased considerably if the sliding motion of the rodent follows the rotation of the swivel platform sooner rather than later. However, in the time between the beginning of the rotation motion and the eventual beginning of the sliding motion, the rodent has some friction on the swivel platform 110 that may prevent the rodent from sliding. The friction may allow the rodent to shift its center of gravity backward or maneuver in such a manner that reverses the rotation of the swivel platform 110. The swivel platform 110 being inclined therefore reduces the time between the rotation motion of the swivel platform 110 and the eventual sliding motion of the rodent. In other words, if the swivel platform 110 is inclined, the rodent starts sliding much sooner after the initiation of rotation, compared to the swivel platform 110 being horizontal, providing less time for the rodent to reverse the rotation of the swivel platform 110.

Figure 5:
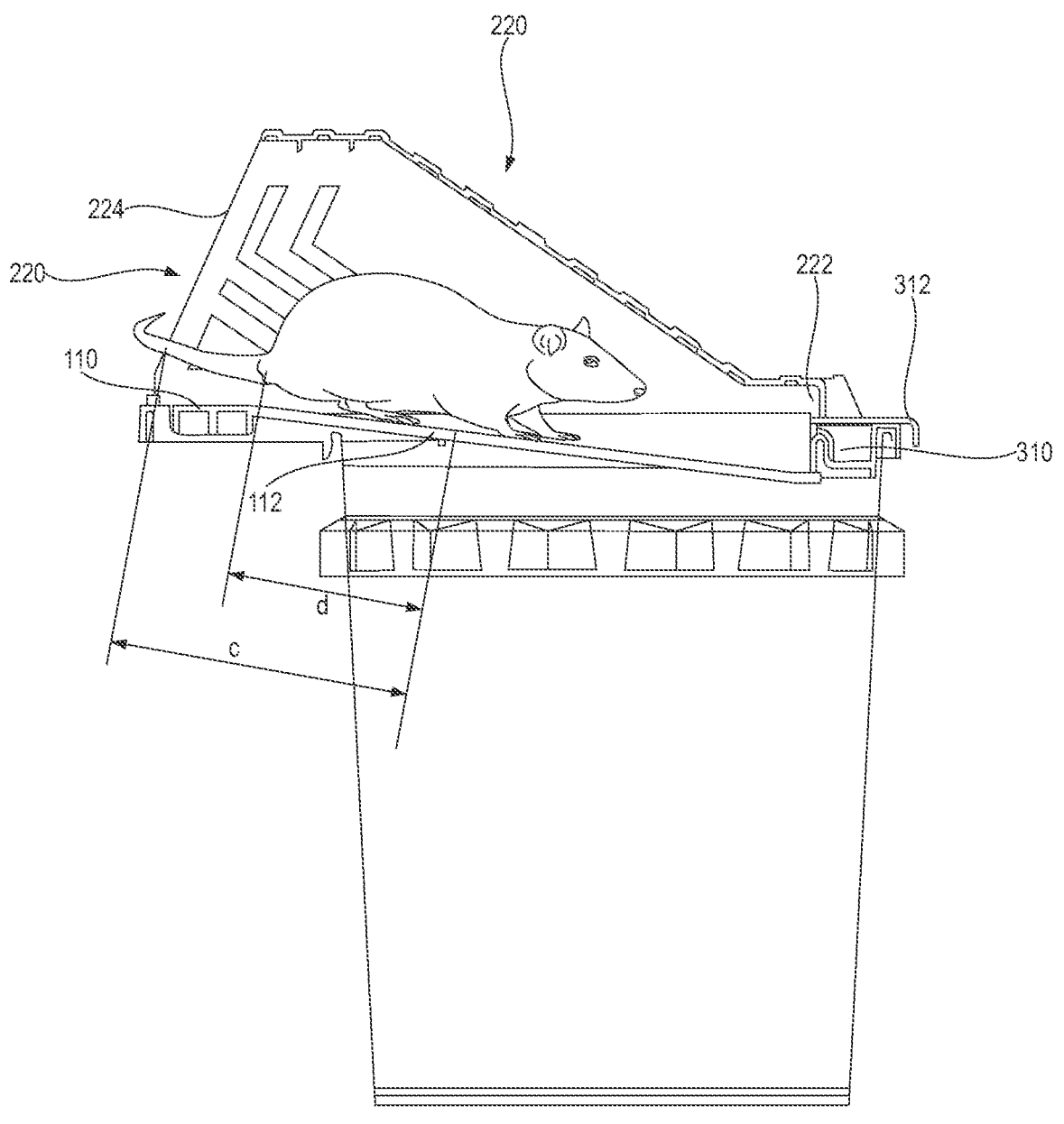
FIG. 5 illustrates a left sectional view of the rodent trapping apparatus with a rodent reaching out to the bait compartment, in accordance with another embodiment of the present invention.

FIG. 5 illustrates a left sectional view of the rodent trapping apparatus 100 with a rodent reaching out to the bait compartment 310, in accordance with another embodiment of the present invention. To ensure that the rodent does not hold onto the walls of the tunnel 220 as the swivel platform 110 rotates, the distance (c) between the pivot axis 112 and the proximal end 224 of the tunnel 220 should be greater than the distance (d) between the center of gravity of the target rodent and the end of target rodent's hind legs stretched out. Assuming that the average length of the rodent is 10 inches and because of the shape of tunnel 220, the center of gravity of the rodent is closer to the middle portion of the rodent, (c) should be greater than 5 inches. Therefore, in several embodiments of the invention, the distance between the proximal end 224 of the tunnel 220 and the pivot axis 112 has been designed to be greater than 5 inches, preferably lie in the range of 5 to 8 inches.

Figure 6A:
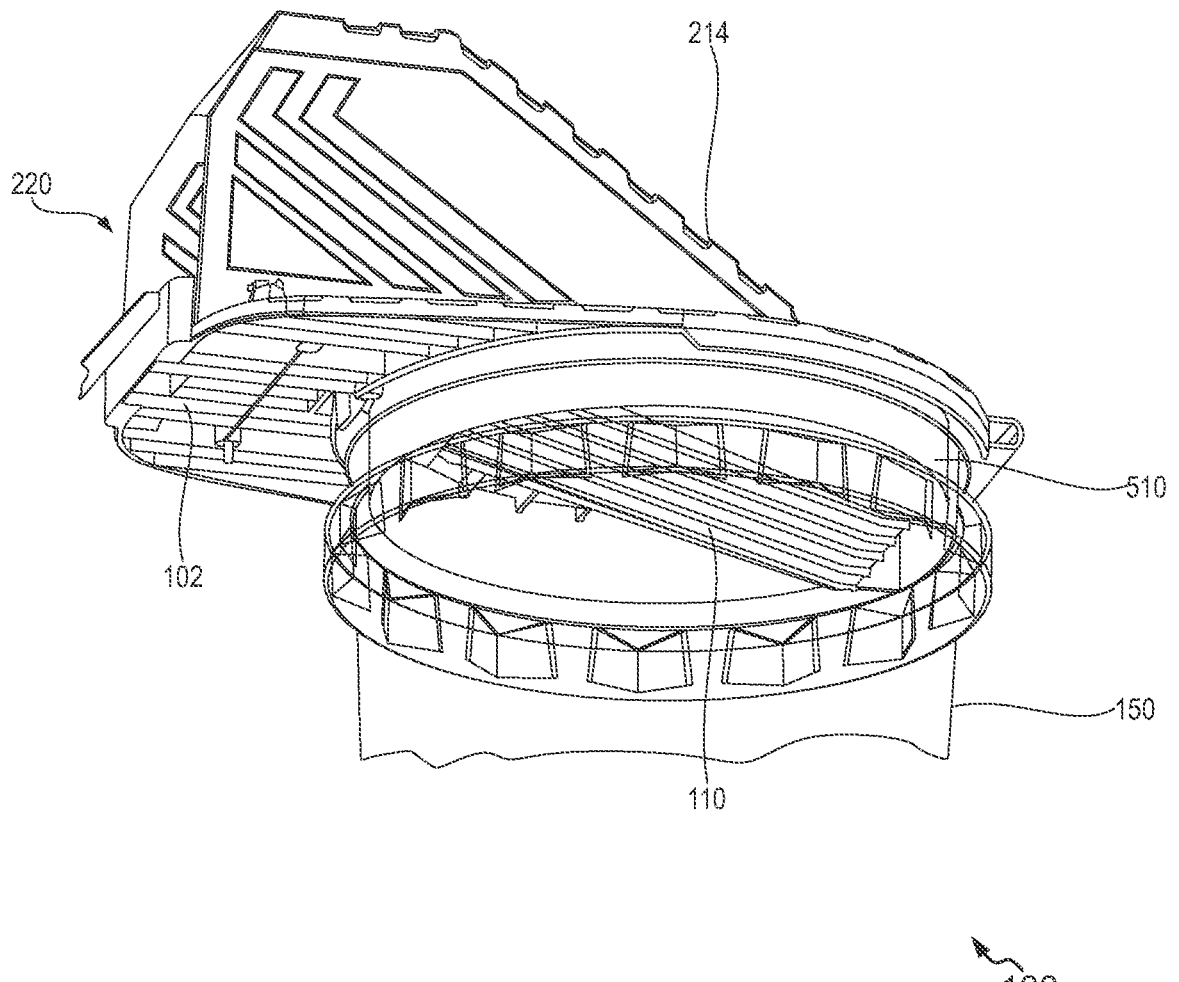
FIG. 6A illustrates a partial perspective view of the rodent trapping apparatus with the bucket, in accordance with another embodiment of the present invention.
Figure 6B:
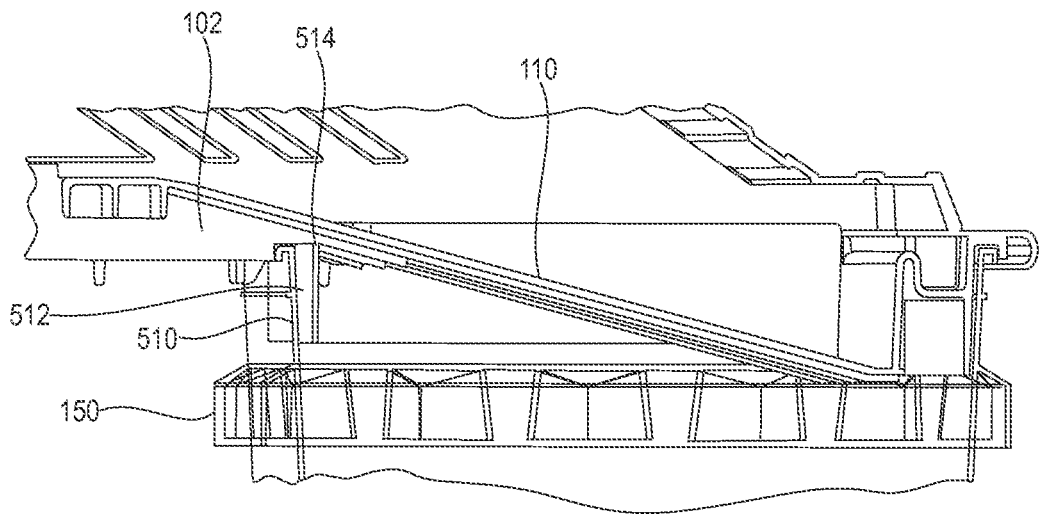
FIG. 6B illustrates a partial sectional view of the rodent trapping apparatus of FIG. 6A, in accordance with another embodiment of the present invention.
Figure 6B:

FIG. 6A illustrates a partial perspective view of the rodent trapping apparatus 100 with the bucket 150, in accordance with another embodiment of the present invention. FIG. 6A illustrates the inclined connecting portion 214 of the tunnel 220 provided over the lid 102. The swivel platform 110 is disposed longitudinally along the lid 102. The volume of the bucket 150 is defined by a peripheral wall 510. The peripheral wall 510 may have a straight profile, a tapered, an inclined profile, or a stepped profile. The peripheral wall 510 illustrated in FIG. 6A has a combination of the tapered and the stepped profile. FIG. 6B illustrates a partial sectional view of the rodent trapping apparatus 100 of FIG. 6A. The partial sectional view illustrates the bucket 150 with the peripheral wall 510. Further, a portion 514 of the lid 102 extends downwards into the bucket 150 to a predetermined depth.

The lid 102 extends downwards to create a rim structure 512 at a predetermined distance from an inner surface of the peripheral wall 510. In the case of the peripheral wall 510 having a tapered profile, the predetermined distance will vary along the depth of the rim structure 512, while having a minimum clearance between the peripheral wall 510 and the rim structure 512. Moreover, the entire rim structure 512 runs along the inner surface of the peripheral wall 510. The rim structure 512 is particularly beneficial in the case of five-gallon buckets, because comparatively larger rodents such as rats are sometimes able to wedge themselves between the bucket 150 and the lid 102, thereby forcing open the lid 102 and escaping, by holding on to the edge of the bucket 150. The rim structure 512 prevents the larger rodents from accessing the edge of the bucket 150. While the rim structure 512 is particularly useful for five-gallon buckets owing to the small size of the five-gallon buckets, the rim structure 512 is not limited to five-gallon buckets only and may be used with other sizes of buckets as per the specific application.

In use, the bait is kept in the bait compartment 310 by opening the cover 312 of the bait compartment 310. The bait has a strong smell which lures the rodents to the bait. The rodent climbs up the bucket 150 through the ramp 230. As the rodent crawls into the tunnel 220 entering from the proximal end 224 and towards the bait compartment 310 at the distal end 222, a moment is exerted on the swivel platform 110 about the pivot axis 112. Due to the moment exerted, the swivel platform 110 rotates and the rodent falls into the bucket 150. In several embodiments of the invention, the distance between the bait compartment 310 and the pivot axis 112 is chosen to ensure that the rodent is not able to balance itself on the swivel platform 110. Further, in several embodiments, the distance between the proximal end 224 of the tunnel 220 and the pivot axis 112 is chosen to ensure that the rodent is not able to hold onto the tunnel entrance with its hind legs. Moreover, in several embodiments, the swivel platform 110 is kept inclined with the horizontal to prevent the rodent from balancing itself on the swivel platform 110 and to prevent the rodent from reversing the rotation of the swivel platform 110. The swivel platform 110 is kept inclined with the horizontal, also to initiate the sliding of the rodent relatively sooner rather than later, thereby reducing the time between initiation of the rotation of the swivel platform 110 about the pivot axis 112 and the eventual sliding motion of the rodent.

In one embodiment of the invention, the rodent trapping apparatus 100 is made of modular design. The apparatus 100 can be shipped in a compact form with multiple components that are then assembled by the consumer (i.e., end-user) once the rodent trapping apparatus 100 has been purchased. The compact design provides massive savings in shipping costs because the assembled rodent trapping apparatus 100 is much larger in volume compared to the disassembled rodent trapping apparatus 100. As the rodent trapping apparatus 100 is shipped in a compact design, more than one rodent trapping apparatus 100 can be shipped together. Further, as the rodent trapping apparatus 100 is of compact design, the rodent trapping apparatus can be easily stored as individual units in the warehouse.

The various components of the rodent trapping apparatus 100 such as the lid 102, the sidewalls 114, the ramp 230, and the swivel platform 110, etc., can be made into modular units. The various components of the rodent trapping apparatus 100 are designed to be easily assembled using one or more securing members. The one or more securing members are not limited to at least one or a combination of guiding pins, double-sided adhesive tape, magnets, snap-fit design, self-tapping screws, fasteners, etc. The double-sided adhesive tape is not limited to 3M's Very High Bond (VHB) tape, etc. In some embodiments of the invention, in addition to the guiding pins, the side walls 114 of the rodent trapping apparatus 100 have one or more flanges that prevent the side walls 114 from leaning inward and causing interference with the swivel platform 110.

Figure 7:
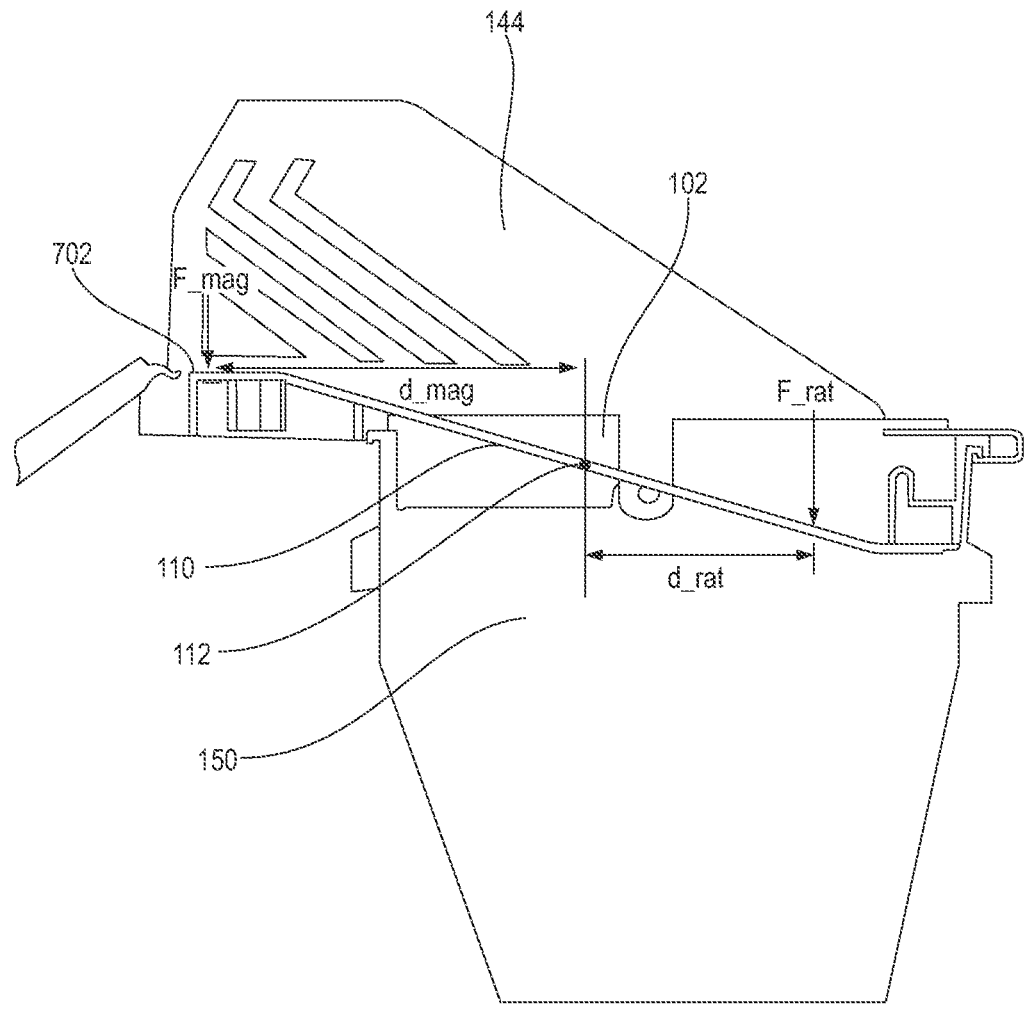
FIG. 7 illustrates a left sectional view of the rodent trapping apparatus of a modular design, in accordance with another embodiment of the present invention.

FIG. 7 illustrates a left sectional view of the rodent trapping apparatus 100 of a modular design, in accordance with another embodiment of the present invention. The various components of the rodent trapping apparatus 100 such as the lid 102, the sidewalls 114, the ramp 230, the bait compartment 310, and the swivel platform 110, etc., are made into modular units and are assembled together at the end user using one or more securing members 702. It should be noted that once the modular type rodent trapping apparatus 100 (see FIGS. 7 to 10B) is installed, and the various elements and their function for trapping the rodent will be the same as described in FIG. 1A to FIG. 6B, hence only elements that differ from the rodent trapping apparatus 100 of FIG. 1A to FIG. 6B are described in the description of FIGS. 7 to 10B.

In one embodiment of the invention, one or more magnets are used as one or more securing members 702. It should be noted that one or more securing members 702 are not limited to one or more magnets, other securing members either alone or in combination can be used to connect the modular components of the rodent trapping apparatus 100.

Figure 8:
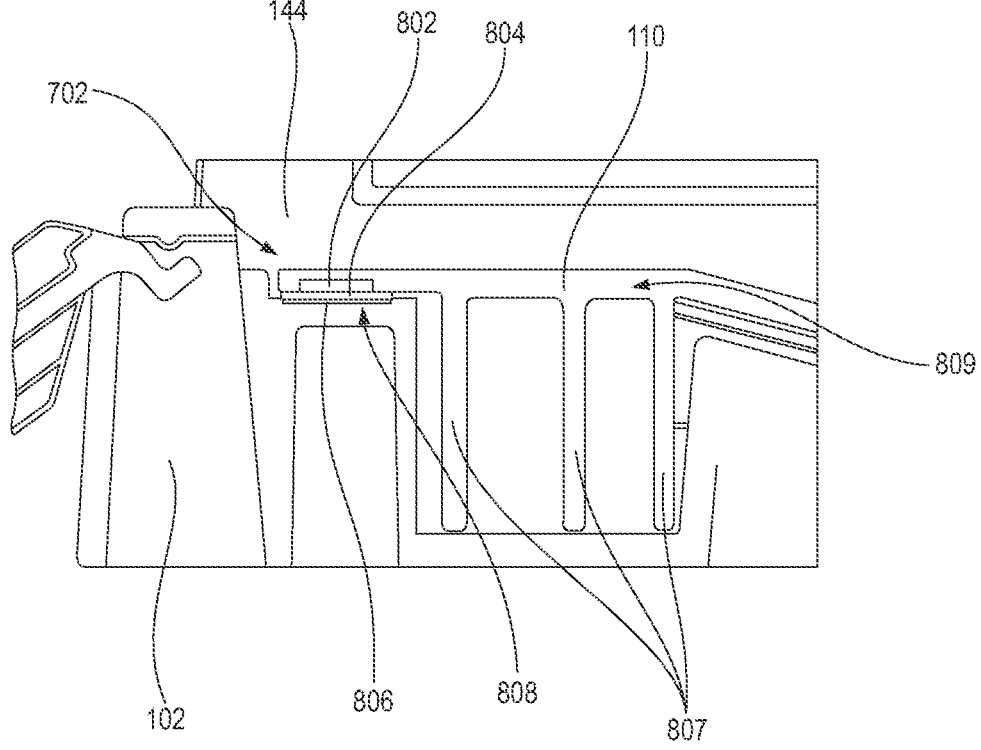
FIG. 8 illustrates a left sectional view of a lid and a swivel platform of the rodent trapping apparatus of FIG. 7 connected using one or more securing members, in accordance with another embodiment of the present invention.

FIG. 8 illustrates a left sectional view of the lid 102 and the swivel platform 110 of the rodent trapping apparatus 100 of FIG. 7 connected using one or more securing members 702 (e.g., one or more magnets 802), in accordance with another embodiment of the present invention. The pivot axis 112 of the rodent trapping apparatus 100 is shown in FIG. 7. As shown in FIG. 7, "d_mag" represents a distance from the pivot axis 112 to the one or more magnets 802, "F_mag" represents a pull force exerted by the one or more magnets 802 on the rodent trapping apparatus 100, "F_rat" represents a force of rodent at which the rodent falls into the bucket 150, and "d_rat" represents a distance from the pivot axis 112 to the center of gravity of the rodent.

Some rodents are more agile and wary, such as the brown rat (species name, *Rattus Norvegicus*). The brown rats are good at finding a balance point of the swivel platform 110 compared to other rodent species. Sometimes brown rats can come back without getting trapped in the rodent trapping apparatus 100 by shifting their weight and maneuvering effectively. In order to more reliably catch such rodents that are more agile and wary, one or more magnets 802 are embedded between the swivel platform 110 and/or the lid 102 of the rodent trapping apparatus 100. In one embodiment of the invention, as shown in FIG. 8, the one or more magnets 802 are embedded in the swivel platform 110, while the lid 102 has the metal plate 804. The metal plate 804 can be made of steel material and can be attached to the lid 102 using the adhesive 806. the Other embodiments are the invention include, the one or more magnets 802 are embedded in the lid 102, while the swivel platform 110 has a metal plate 804. The metal plate 804 can be made of steel material and can be attached to the bucket 150 as shown in FIG. 8 using an adhesive 806. During the installation of modular units, the lid 102 can be mounted over the bucket 150, by allowing the one or more magnets 802 in the lid 102 to get attracted to the metal plate 804 of the bucket 150. In some embodiments, both the swivel platform 110 and the lid 102 can have magnets. Further, the number of magnets used in the rodent trapping apparatus 100 is not limited to a specific number, size, shape, and type of magnets, it varies based on the rodent type, shape, etc.

In one embodiment of the invention, the one or more magnets 802 are molded into the swivel platform 110 using an injection mold process. The metal plate 804 can be affixed to the lid 102, using the adhesive 806. In another embodiment of the invention, the one or more magnets 802 are molded into the lid 102 using an injection mold process. The metal plate 804 can be affixed to the swivel platform 110, using the adhesive 806.

In some embodiments of the invention, the magnet strength of the one or more magnets 802 can be varied, depending on the type of rodent intended to be caught. By increasing the magnetic strength, the distance from the pivot axis 112 to the center of gravity of the rodent can be increased, thereby more effective rodent trapping apparatus 100 can be achieved. The rodent can pass the pivoting axis 112 and move toward the bait compartment 310. The one or more magnets 802 serves for two purposes. Firstly, the one or more magnets 802 increases the distance from the pivot axis 112 to the center of gravity of the rodent, and secondly, the one or more magnets 802 prevent the swivel platform 110 from rotating earlier. The swivel platform 110 may rotate earlier, if no magnets are used, in such an arrangement, the rodents (e.g., brown rats) may escape without getting trapped in the rodent trapping apparatus 100. While using one or more magnets 802, the rodent trapping apparatus 100 is designed in such a manner that until trapping is activated, the one or more magnets 802 do not release from the metal plate 804 of the lid 102.

It should be noted that the magnet should have a pull force such that the smallest target rodent can be caught. For instance, a grown brown rat typically weighs between 140 g to 500 g. Using basic see-saw physics calculations, the one or more magnets 804 that will release a 140 g rodent is 6 inches from the pivot axis 112. In the above scenario, a magnet pull force (F_mag) of 1.39 N can be selected. The force calculation used in the rodent trapping apparatus 100 is as follows:

$$F\_mag * d\_mag = F\_rat * d\_rat, \text{ where } F\_rat = m\_rat * g \quad \text{Equation (1)}$$

$$\text{Therefore, } F\_mag * d\_mag = (m\_rat * g) * d\_rat \quad \text{Equation (2)}$$

In Equation (2), "F_mag" represents the pull force of the one or more magnets 802, that is the force required to pull the magnet straight free vertically from the swivel platform 110, "d_mag" represents a distance from the pivot axis 112 to the one or more magnets 802, "m_rat" represents mass of the rodent, "g" represents a gravitational acceleration (i.e., 9.8 m/s/s), and "d_rat" represents a distance from the pivot axis 112 to the center of gravity of the rodent.

It should be noted that the smaller rodents such as mice, rat pups, etc., can be caught using one or more magnets 802 of lessor pull fore based on the Equation (2). However, the smaller the magnet strength is, the less effective for catching larger rodents. The very large rodent, for instance of 500 g in mass, if the magnet pull force is very small, the magnet will release when the center of gravity of the rodent is only a few distance (in mm) passed the pivot axis 112. It has been found that when the distance (d_rat) is just a few millimeters, large rats can pull out of the trap even after the swivel platform 110 starts rotating. For example, the rodent trapping apparatus 100 with one or more magnets 802 will release if a 22 g rodent gets to 6 inches from the pivot axis 112 (0.22N pull strength), whereas a 500 g rodent will be released only at 6 mm after the pivot axis 112. If the large rodent (e.g., brown rat) is very agile and wary, the rodent is sometimes able to shift its own weight in time to stop the swivel platform 110 from rotating too far, and reverse the rotation, and escape.

In one embodiment of the invention, to cover trapping of all types of rodents, the one or more magnets 802 as shown in FIG. 8 can be interchanged to obtain different magnetic strength depending on the type and size of the rodents. Rodents of smaller size require, a small magnet pull force, while larger rodents need a larger pull force. In some embodiment of the invention, especially in the modular type of the rodent trapping apparatus 100 as shown in FIG. 8, one or more swivel platforms with one or more magnets 802 of different magnetic strengths can be used. For example, one swivel platform can have one or more magnets 802 of lesser magnetic strength, while another swivel platform can have one or more magnets 802 of greater magnetic strength. The user can interchange the swivel platform based on the requirement of the magnetic strength and type of the rodents.

In one embodiment of the invention, the ramp 230 can be designed for the bucket 150 of both seven-gallon and five-gallon. The bucket 150 of both seven-gallon and five-gallon has the same diameter while the height of both seven-gallon and five-gallon varies. For example, the height of the five-gallon is typically 14.25 inches, while that of the seven-gallon is typically 19.5 inches. The modular interface that connects the ramp 230 and the lid 102 is designed in such a manner that the same interface can be used to accept the bucket 150 of different gallons, for example, seven-gallon and five-gallon. It should be noted that the lid 102 can be adapted to cover any standard size of commercially available bucket sizes.

It should be noted that the important function of the swivel platform 110 is that it can automatically reset the rodent trapping apparatus 100. For example, when the rodent falls into the bucket 150, the swivel platform 110 will move back to the original position. This is done by designing the plate with a loading element 807 as shown in FIG. 8. When the rodent falls into the trap, the swivel platform 110 will be in a vertical position. Due to center of gravity of the swivel platform 110, the entrance side of the rodent trapping apparatus 100 is pulled down due to the weight of the loading element 807, so that the rodent trapping apparatus 100 is automatically reset.

It should be noted that the swivel platform 110 includes a first portion 808 positioned below the distal end of the tunnel 220. The first portion 808 includes the one or more securing members 702 for connecting the swivel platform 110 with the lid 102. The one or more securing members 702 include one or more magnets 802 of varying magnetic strength and are adapted to increase a distance between the pivot axis 112 and center of gravity of the rodent. The swivel platform 110 also includes a second portion 809 positioned below the distal end of the tunnel 220. The second portion 809 includes the loading element 807 configured to reset the swivel platform 110 after the rodent is trapped inside the bucket 150.

FIG. 9 illustrates a left sectional view of the rodent trapping apparatus of FIG. 7 with at least one first securing structure 902 and at least one second securing structure 908, for enabling and disabling the rodent trapping apparatus 100, in accordance with an embodiment of the present invention. The first securing member 902 is mounted to the lid 102 and adapted to disable movement of the swivel platform 110 during a disabled state of the rodent trapping apparatus 100. The second securing member 908 is mounted to the cover 312 and the bucket 150 and adapted to lock the cover 312 with the bucket 150, during an enabled state of the rodent trapping apparatus 100.

In one embodiment of the invention, the first securing structure 902 has a first receiving member 906A, and a second receiving member 906B. The first securing structure 902 is mounted to the lid 102, such that the first securing structure 902 is positioned below the swivel platform 110. The rodent trapping apparatus 100 also has a locking member (e.g., locking pin 904) for locking the rodent trapping apparatus 100 in the enabled state or the disabled state. When the locking pin 904 is inserted into the first receiving member 906A and the second receiving member 906B, as shown in FIG. 9, the swivel platform 110 is locked and hence cannot swivel about the pivot axis 112. FIG. 9 shows the rodent trapping apparatus 100 in a "disabled state" (not used for trapping the rodents). In the disabled state, the user of the rodent trapping apparatus 100 can place a bait directly on the swivel platform 110 or in the bait compartment 310, to allow rats and other rodents to feed on the bait. This is done to target rodents or rat colonies to get used to the rodent trapping apparatus 100.

The rodent trapping apparatus 100 can be left in the disabled state with bait for a week or more. After the rodents have become used to feeding in the rodent trapping apparatus 100, locking pin 904 can be removed from the first receiving member 906A and the second receiving member 906B. This allows the rodent trapping apparatus 100 ready for trapping the rodents (i.e., "enabled state"). FIG. 9 also shows the second securing structure 908 and the locking pin 904 for locking the cover 312 of the bait compartment 310 of the rodent trapping apparatus 100.

FIG. 10A illustrates a left sectional view of the second securing structure 908 for locking the cover 312 of the bait compartment 310 of the rodent trapping apparatus 100 of FIG. 9, in accordance with an embodiment of the present invention. After removing the locking pin 904 from the first securing structure 902 (to enable the rodent trapping apparatus 100, referred to as "enabled state"), the locking pin 904 can be inserted into the second securing structure 908 as shown in FIG. 10A. As the rodents have become familiar with feeding in the rodent trapping apparatus 100, rodents can move freely in the used space and get caught in the rodent trapping apparatus 100.

When the rodent trapping apparatus 100 is in the disabled state, there is no need to lock the cover 312 of the bait compartment 310 with the bucket 150. When the rodent trapping apparatus 100 is enabled or activated by removing the locking pin 904 from the first securing structure 902, the rodent trapping apparatus 100 starts its trapping function and hence it is essential to lock the cover 312 of the bait compartment 310 with the bucket 150 to prevent the cover 312 being removed from the bucket 150 and causing the rodents reaching the bait compartment 310 to escape. At the time of enabled state, the locking pin 904 is secured in the second securing structure 908 to lock the cover 312 of the bait compartment 310 with the bucket 150.

FIG. 10B illustrates a left sectional view of the first securing structure 902, for enabling and disabling the rodent trapping apparatus 100 of FIG. 9, in accordance with an embodiment of the present invention. A spring loaded pin is used as locking pin 904. The spring loaded pin has a retaining ring 1002 and a spring 1004. The retaining ring 1002 retains the movement of the spring 1004, thereby retaining the movement of the swivel platform 110.

It should be noted that the design, structure, and mechanism of the first securing structure 902, the second securing structure 908, and the locking member (e.g., locking pin 904) as shown in FIG. 9, FIG. 10A, and FIG. 10B, corresponds to one or more embodiments of the invention. Without limitation, any suitable mechanism, structure, and design of the first securing structure 902, the second securing structure 908, and the locking member other than as shown in FIG. 9, FIG. 10A, and FIG. 10B can be used for disabling and enabling the rodent trapping apparatus 100, depending upon the structure, design, and mechanism of the swivel platform 110, the bait compartment 310, the cover 213, or the bucket 150. In one embodiment, the first securing structure 902 has only one receiving member (e.g., the first receiving member 906A or the second receiving member 906B) positioned at the bottom of the swivel platform 110. The receiving member extends along the width of the swivel platform 110 and the locking member (e.g., locking pin 904) can be inserted into the receiving member (e.g., the first receiving member 906A or a second receiving member 906B) in order to disable the rodent trapping apparatus 100. It should be noted that the position of the first securing structure 902, the second securing structure 908, and the locking member (e.g., locking pin 904) are not limited as shown in FIG. 9, FIG. 10A, and FIG. 10B. The first securing structure 902 and/or the second securing structure 908 can also be located near the located at an end of the swivel plate 110 (e.g., at the distal end of the tunnel 220 where bait compartment 310 is located). Thus, the present invention efficiently traps the different types of the rodents. Further, the modular design of the rodent trapping apparatus 100 allows easy transportation and assembling of the rodent trapping apparatus 100 at the end user side.

Various embodiments of the disclosure, as discussed above, may be practiced with steps and/or operations in a different order, and/or with hardware elements in configurations, which are different from those which are disclosed. Therefore, although the disclosure has been described based on these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A rodent trapping apparatus for trapping rodents, the rodent trapping apparatus comprising:
   a lid configured to be disposed on a bucket, the lid including a top surface, wherein the lid comprises a longitudinal slot having two opposing longitudinal edges;

two sidewalls provided on the top surface, with a respective sidewall of the two sidewalls along each longitudinal edge of the longitudinal slot, wherein the two sidewalls extend up to an edge of the lid;

a transverse connecting member connecting the two sidewalls thereby forming a tunnel over the longitudinal slot, a proximal end of the tunnel being located at the edge of the lid due to the two sidewalls extending up to the edge of the lid;

a bait compartment located at a distal end of the tunnel, the distal end of the tunnel being formed by a distal connecting portion of the transverse connecting member and two distal segments of the two sidewalls;

a swivel platform located within and along the longitudinal slot, wherein the swivel platform is configured to swivel about a pivot axis, wherein the pivot axis is located between the distal end and the proximal end of the tunnel, wherein the bait compartment is disposed at a distance from the pivot axis, wherein the distance between the bait compartment and the pivot axis is greater than a distance between a nose and a center of gravity of a rodent to be trapped, wherein the swivel platform is in an inclined position at an angle of inclination greater than 0 degrees which represents a horizontal orientation of the swivel platform to reduce a time between rotation of the swivel platform and corresponding sliding of the rodent, and wherein the swivel platform comprises a loading element configured to reset the swivel platform, due to a weight of the loading element, after the rodent is trapped inside the bucket, by moving the swivel platform from a vertical position to the inclined position;

a locking pin configured for locking the rodent trapping apparatus in an enabled state or a disabled state; and a first securing structure comprising receiving members mounted to the lid such that the receiving members are positioned below the swivel platform and are adapted to disable movement of the swivel platform such that the swivel platform cannot pivot about the pivot axis during the disabled state of the rodent trapping apparatus when the locking pin is inserted into the receiving members such that the locking pin extends across and underneath the swivel platform;

wherein the proximal end of the tunnel is disposed at a distance from the pivot axis, wherein the distance between the proximal end of the tunnel and the pivot axis lies in the range of 3 to 10 inches, wherein the proximal end of the tunnel is located at the edge of the lid extending beyond an outer perimeter of the bucket when the lid is disposed on the bucket, wherein the lid includes an overhang portion that extends beyond an edge of the bucket when the lid is disposed on the bucket, to accommodate the swivel platform and the tunnel having dimensions sufficient to trap rodents larger than a predetermined size; and wherein the distance between the bait compartment and the pivot axis lies in the range of 5 to 11 inches.

2. The rodent trapping apparatus as claimed in claim 1, wherein the angle of inclination of the swivel platform is less than or equal to 45 degrees, wherein the swivel platform initiates the rotation as the rodent moves towards the bait compartment, wherein the inclined position of the swivel platform causes the rodent to begin sliding earlier as compared to the horizontal orientation, thereby reducing time available for the rodent to reverse the rotation of the swivel platform.

3. The rodent trapping apparatus as claimed in claim 1, wherein the bait compartment includes a U-shaped cover and a material of the cover is stainless steel.

4. The rodent trapping apparatus as claimed in claim 3, further comprising:

at least one second securing structure mounted to the cover and mountable to the bucket when the lid is disposed on the bucket and adapted to lock the cover with the bucket, during the enabled state of the rodent trapping apparatus.

5. The rodent trapping apparatus as claimed in claim 1, further comprising a ramp configured to be provided between ground and the top surface of the lid, wherein the ramp connects the ground level with the top surface of the lid at the proximal end of the tunnel.

6. The rodent trapping apparatus as claimed in claim 1, wherein the transverse connecting member further comprises an inclined connecting portion connecting the two sidewalls and providing an inclined section to the tunnel.

7. The rodent trapping apparatus as claimed in claim 1, wherein the lid comprises a portion extending downwards to a predetermined depth to create a rim structure, wherein when the lid is disposed on the bucket, the rim structure is adapted to run along an inner surface of a peripheral wall of the bucket to prevent rodents from accessing the edge of the bucket, while maintaining a minimum predetermined distance from the inner surface.

8. The rodent trapping apparatus as claimed in claim 1, wherein the lid, the two sidewalls, the transverse connecting member, the bait compartment and the swivel platform are of modular units and are connected together to form the rodent trapping apparatus using one or more securing members.

9. The rodent trapping apparatus as claimed in claim 8, wherein the swivel platform comprises a first portion positioned below the proximal end of the tunnel, the first portion comprises the one or more securing members for connecting the swivel platform with the lid, the one or more securing members comprises one or more magnets of varying magnetic strength, adapted to increase a distance that a rodent must travel along the swivel platform from the proximal end of the tunnel toward the distal end of the tunnel before the swivel platform rotates.

10. The rodent trapping apparatus as claimed in claim 1, wherein the swivel platform comprises a second portion positioned below the distal end of the tunnel.

11. A rodent trapping apparatus for trapping rodents, the rodent trapping apparatus comprising:

a lid configured to be disposed on a bucket, the lid including a top surface, wherein the lid comprises a longitudinal slot having two opposing longitudinal edges;

two sidewalls provided on the top surface, with a respective sidewall of the two sidewalls along each longitudinal edge of the longitudinal slot, wherein the two sidewalls extend up to an edge of the lid;

a transverse connecting member connecting the two sidewalls thereby forming a tunnel over the longitudinal slot, a proximal end of the tunnel being located at the edge of the lid due to the two sidewalls extending up to the edge of the lid;

a bait compartment located at a distal end of the tunnel, the distal end of the tunnel being formed by a distal connecting portion of the transverse connecting member and two distal segments of the two sidewalls; and a swivel platform located within and along the longitudinal slot, wherein the swivel platform is configured to swivel about a pivot axis, wherein the pivot axis is located between the distal end and the proximal end of the tunnel, wherein the lid, the two sidewalls, the transverse connecting member, the bait compartment, and the swivel platform are modular units and are connected together to form the rodent trapping apparatus using one or more securing members, wherein the bait compartment is disposed at a distance from the pivot axis, wherein the distance between the bait compartment and the pivot axis is greater than a distance between a nose and a center of gravity of a rodent to be trapped, wherein the swivel platform is in an inclined position at an angle of inclination greater than 0 degrees which represents a horizontal orientation of the swivel platform to reduce a time between rotation of the swivel platform and corresponding sliding of the rodent, and wherein the swivel platform comprises a loading element configured to reset the swivel platform, due to a weight of the loading element, after the rodent is trapped inside the bucket, by moving the swivel platform from a vertical position to the inclined position;

a locking pin configured for locking the rodent trapping apparatus in an enabled state or a disabled state; and a first securing structure comprising receiving members mounted to the lid such that the receiving members are positioned below the swivel platform and are adapted to disable movement of the swivel platform such that the swivel platform cannot pivot about the pivot axis during the disabled state of the rodent trapping apparatus when the locking pin is inserted into the receiving members such that the locking pin extends across and underneath the swivel platform;

wherein the proximal end of the tunnel is disposed at a distance from the pivot axis, wherein the distance between the proximal end of the tunnel and the pivot axis lies in the range of 3 to 10 inches, wherein the proximal end of the tunnel is located on the edge of the lid extending beyond an outer perimeter of the bucket when the lid is disposed on the bucket, and wherein the lid includes an overhang portion that extends beyond an edge of the bucket when the lid is disposed on the bucket, to accommodate the swivel platform and the tunnel having dimensions sufficient to trap rodents larger than a predetermined size.

12. The rodent trapping apparatus as claimed in claim 11, wherein the swivel platform is in the inclined position at the angle of inclination, along the longitudinal slot, wherein the angle of inclination of the swivel platform lies in the range of 2.5 to 45 degrees.

13. The rodent trapping apparatus as claimed in claim 11, wherein the distance between the bait compartment and the pivot axis lies in the range of 6 to 12 inches.

14. The rodent trapping apparatus as claimed in claim 11, wherein the distance between the proximal end of the tunnel and the pivot axis lies in the range of 5 to 8 inches.

15. The rodent trapping apparatus as claimed in claim 11, wherein the transverse connecting member further comprises an inclined connecting portion connecting the two sidewalls and providing an inclined section to the tunnel.

16. The rodent trapping apparatus as claimed in claim 11, wherein the lid comprises a portion extending downwards to a predetermined depth to create a rim structure, wherein when the lid is disposed on the bucket, the rim structure is adapted to run along an inner surface of a peripheral wall of the bucket while maintaining a minimum predetermined distance from the inner surface.

17. The rodent trapping apparatus as claimed in claim 11, wherein the bait compartment includes a cover and a material of the cover is stainless steel.

18. The rodent trapping apparatus as claimed in claim 17, further comprising:

at least one second securing structure mounted to the cover and mountable to the bucket when the lid is disposed on the bucket and adapted to lock the cover with the bucket, during the enabled state of the rodent trapping apparatus.

19. A rodent trapping apparatus for trapping rodents, the rodent trapping apparatus comprising:

a lid configured to be disposed on a bucket, the lid including a top surface, wherein the lid comprises a longitudinal slot having two opposing longitudinal edges;

two sidewalls provided on the top surface, with a respective sidewall of the two sidewalls along each longitudinal edge of the longitudinal slot, wherein the two sidewalls extend up to an edge of the lid;

a transverse connecting member connecting the two sidewalls thereby forming a tunnel over the longitudinal slot, a proximal end of the tunnel being located at the edge of the lid due to the two sidewalls extending up to the edge of the lid;

a bait compartment located at a distal end of the tunnel, the distal end of the tunnel being formed by a distal connecting portion of the transverse connecting member and two distal segments of the two sidewalls;

a swivel platform located within and along the longitudinal slot, wherein the swivel platform is configured to swivel about a pivot axis, wherein the pivot axis is located between the distal end and the proximal end of the tunnel;

wherein the proximal end of the tunnel comprises one or more securing members for connecting the swivel platform with the lid, the one or more securing members are one or more magnets of varying magnetic strength adapted to increase a distance that a rodent must travel along the swivel platform from the proximal end of the tunnel toward the distal end of the tunnel before the swivel platform rotates, wherein the bait compartment is disposed at a distance from the pivot axis, wherein the distance between the bait compartment and the pivot axis is greater than a distance between a nose and a center of gravity of a rodent to be trapped, wherein the swivel platform is in an inclined position at an angle of inclination greater than 0 degrees which represents a horizontal orientation of the swivel platform to reduce a time between rotation of the swivel platform and corresponding sliding of the rodent, and wherein the swivel platform comprises a loading element configured to reset the swivel platform, due to a weight of the loading element, after the rodent is trapped inside the bucket, by moving the swivel platform from a vertical position to the inclined position;

a locking pin configured for locking the rodent trapping apparatus in an enabled state or a disabled state; and a first securing structure comprising receiving members mounted to the lid such that the receiving members are positioned below the swivel platform and are adapted to disable movement of the swivel platform such that the swivel platform cannot pivot about the pivot axis during the disabled state of the rodent trapping apparatus when the locking pin is inserted into the receiving members such that the locking pin extends across and underneath the swivel platform;

wherein the proximal end of the tunnel is disposed at a distance from the pivot axis, wherein the distance between the proximal end of the tunnel and the pivot axis lies in the range of 3 to 10 inches, wherein the proximal end of the tunnel is located on the edge of the lid extending beyond an outer perimeter of the bucket when the lid is disposed on the bucket, and wherein the lid includes an overhang portion that extends beyond an edge of the bucket when the lid is disposed on the bucket, to accommodate the swivel platform and the tunnel having dimensions sufficient to trap rodents larger than a predetermined size.

20. The rodent trapping apparatus as claimed in claim 19, wherein the distance between the bait compartment and the pivot axis is in the range of 5 to 12 inches.

21. The rodent trapping apparatus as claimed in claim 19, wherein the distance between the proximal end of the tunnel and the pivot axis lies in the range of 5 to 8 inches.

22. The rodent trapping apparatus as claimed in claim 19, wherein the angle of inclination of the swivel platform lies in the range of 2.5 to 45 degrees.

23. The rodent trapping apparatus as claimed in claim 19, further comprising a ramp configured to be provided between ground and the top surface of the lid, wherein the ramp connects the ground level with the top surface of the lid at the proximal end of the tunnel.

24. The rodent trapping apparatus as claimed in claim 19, wherein the transverse connecting member further comprises an inclined connecting portion connecting the two sidewalls and providing an inclined section to the tunnel.

25. The rodent trapping apparatus as claimed in claim 19, wherein the bait compartment includes a cover and a material of the cover is stainless steel.

26. The rodent trapping apparatus as claimed in claim 25, further comprising:

at least one second securing structure mounted to the cover and mountable to the bucket when the lid is disposed on the bucket and adapted to lock the cover with the bucket, during the enabled state of the rodent trapping apparatus.

27. The rodent trapping apparatus as claimed in claim 19, wherein the lid comprises a portion extending downwards to a predetermined depth to create a rim structure, wherein when the lid is disposed on the bucket, the rim structure is adapted to run along an inner surface of a peripheral wall of the bucket while maintaining a minimum predetermined distance from the inner surface.

* * * * *